May 17, 1927.
E. F. TOBOLD
DUST CAP
Filed Aug. 11, 1920
1,628,694
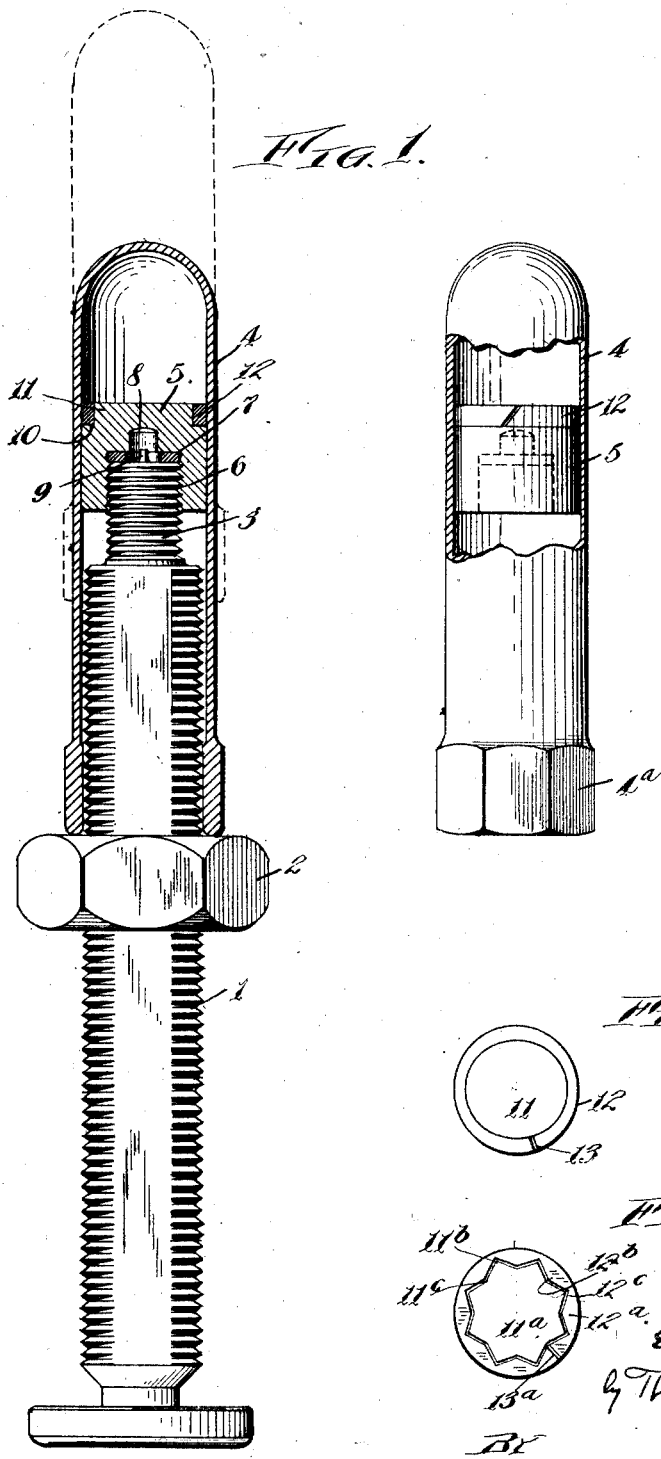

Patented May 17, 1927.

1,628,694

UNITED STATES PATENT OFFICE.

EWALD F. TOBOLD, OF CLEVELAND, OHIO, ASSIGNOR TO THE DILL MANUFACTURING COMPANY, A CORPORATION OF OHIO.

DUST CAP.

Application filed August 11, 1920. Serial No. 402,845.

The present invention relates to a cap which is so constructed that it may be quickly attached and detached from a stem such for instance as a valve stem.

One of the objects of the invention is to provide a dust cap which instead of requiring that the dust cap be threaded over the entire threaded portion of the valve stem, may be attached by a few turns of the cap and requiring only a limited thread engagement between the valve stem and the threaded portion of the cap.

Another object of the invention is to provide a cap which may be attached to the usual valve stems which are at present in use without requiring any special rim nut or other auxiliary attachment.

Another object of the invention is to provide a cap which may be made of round cross-section with an internal member adapted to secure attachment to the valve stem and as a further object the provision of a construction whereby when the internal member is secured upon the valve stem, the cap proper will be locked to the internal member, and thus to the valve stem.

Reference should be had to the accompanying drawings forming a part of this specification, in which Fig. 1 is an elevation with portions in section of a cap embodying my invention, attached to a valve stem; Fig. 2 is an elevation with portions in section of the cap; Fig. 3 is a plan view of the attaching elements; Fig. 4 is a plan view of a modified form of the attaching elements.

Referring to the drawings, 1 indicates a threaded valve stem of well known construction; 2 represents the usual rim nut which is employed in connection with such valve stems; 3 represents the threaded projection of lesser diameter than the main portion of the valve stem which is also the usual construction at present employed.

At 4 is represented a cap or shell which is preferably made by a drawing process from sheet metal. The lower portion of the shell 4 is shown of hexagonal form as indicated at 4ª but this is not necessary. As will be noted, the shell 4 is preferably round or circular in cross-section.

Within the cap portion is what may be termed an attaching member 5. This member comprises a body portion with a threaded opening such as indicated at 6. In the present form as illustrated in the drawing, the opening is of a diameter to receive the threaded extension 3 of the valve stem. This is but indicative of any form of attachment, and the member 5 may be otherwise attached to the valve stem, and to other portions of the valve stem than that shown in the drawing without departing from the spirit of this invention.

Where the attaching member 5 is constructed so as to co-operate with the threaded extension 3 of the valve stem, the recess 6 at its inner end is provided with a packing washer 7 which serves as a packing for the end of the valve stem. The member 5 also may be provided with an additional depression such as indicated at 8 which will permit the stem of the valve inside, such as indicated at 9, to project beyond the threaded portion 3 of the valve stem.

The attaching member 5 is preferably made of such a diameter as to snugly fit within the cap portion 4 and at its upper end is provided with a shoulder 10 and a portion 11 which projects above the shoulder 10.

Surrounding the extending portion 11 and co-operating with the shoulder 10 is a member which may be termed an expanding member. This member may be generally described as a ring like body made of material having required springiness or resiliency, the ring member being preferably split so that normally it springs outwardly into engagement of the inner wall of the cap 4.

The extension 11 and the ring member which surrounds the same are so formed that when the attaching member 5 has become attached to the valve stem in placing the cap on a valve stem, the continued rotation of the cap 4 will cause relative movement between the extension 11 and the ring which co-operates therewith, whereby the split ring member will be further expanded and lock the cap member 4 against further rotation.

There are various forms which the extension 11 and the ring member co-operating therewith may assume. One of these forms is shown in Fig. 3 wherein the extension 11 is slightly elliptical or eccentric with respect to the central axis of the member 5. The particular ring member which co-operates therewith is indicated at 12 and is split as indicated at 13. This ring member is of course of such a diameter as fits within the cap member 4.

As will be readily seen, remembering that the ring 12 is in frictional engagement with the cap 4, when the cap with its member 5 is introduced onto a valve stem, and rotation imparted to the cap, the member 5 threads on to the extension 3 of the valve stem and as soon as this is accomplished the member 5 becomes fixed and continued rotation of the cap 4 causes the ring 12 to turn relative to the projection 11 and because of the eccentric character of the projection 11 the ring 12 is further expanded and ultimately binds the cap 4 against further rotation.

Preferably the attaching member 5 is a fit but slidable within the cap 4, thus the member 5 may be positioned to accommodate the cap to cover that part of the valve stem which in the particular instance may extend beyond the rim nut or beyond the felloe of the wheel if a rim nut is not used.

If the attaching member 5 occupies a position toward the open end of the cap when the attaching operation is commenced, after the member 5 is threaded on to the valve stem, the cap 4 may be pushed over the valve stem until the edge of the cap at the open end contacts with the rim nut or with the felloe of the wheel, the turning operation upon the cap continued until the cap is locked. The frictional engagement between the inner end of the cap and the rim nut or the felloe of the wheel, if no rim nut be used, assists in holding the cap in its locked position.

A modified construction which will accomplish the same results as before described is shown in Fig. 4. In this construction the extension of the member 5 is indicated at 11$^a$ and this extension is provided with a plurality of short extensions such as indicated at 11$^b$ and between the extensions there are depressions 11$^c$.

The co-operating ring member is indicated at 12$^a$ and it likewise is provided with inwardly extending projections 12$^b$ and intermediate depressions 12$^c$. The ring member 12$^a$ is split as indicated at 13$^a$.

The ring member 12$^a$ is made of suitable resilient material and when placed in the cap 4 normally springs outward into engagement with the inner wall of the cap. When the member 5 becomes attached to the valve stem, incident to applying the dust cap, it produces relative rotation between the member 12$^a$ and the projection 11$^a$ which causes the engaging projections on these two members to ride up on each other and effect a camming action between the projection 11$^a$ and the ring 12$^a$, which expands the ring 12$^a$ into close frictional engagement with the cap 4.

Various modifications embodying the principle of operation of the herein described cap may be employed without departing from the spirit of this invention.

Having described my invention, I claim:

1. A cap comprising a shell portion, a member within the shell portion and having means by which it may be attached to a stem, an expansible element associated with said member, said expansible element and the said member co-operating to cause expansion of the expansible member when the two are relatively turned.

2. A cap comprising a shell portion, an attaching member therein and having means by which it may be attached to a stem, said attaching member having a projecting portion, an expansible element within the shell and co-operating with the projecting portion of the attaching member whereby the expansible element is caused to expand upon relative turning movement between the expansible element and the projection on the attaching member.

In testimony whereof, I hereunto affix my signature.

EWALD F. TOBOLD.